United States Patent Office 3,522,995
Patented Aug. 4, 1970

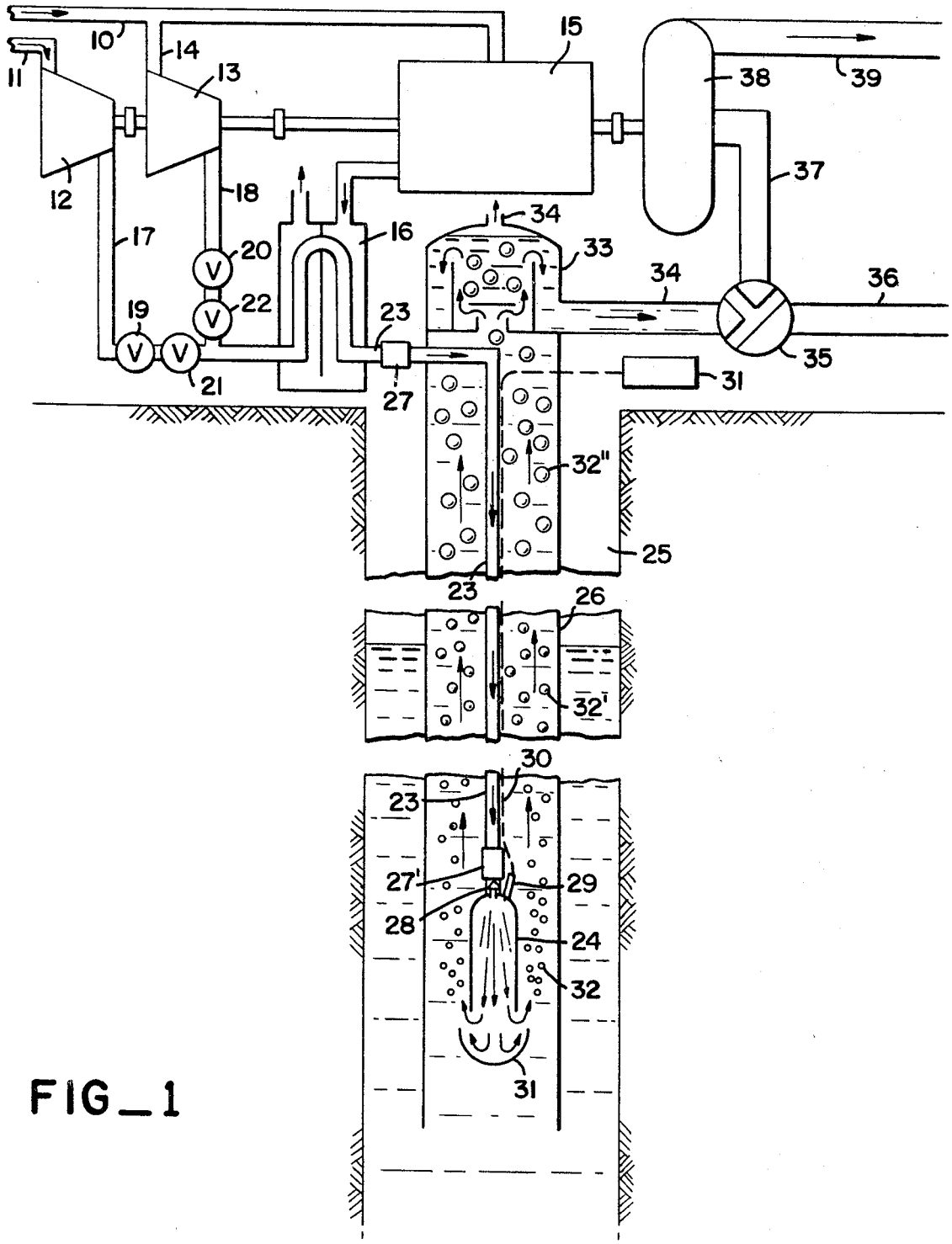
FIG_1

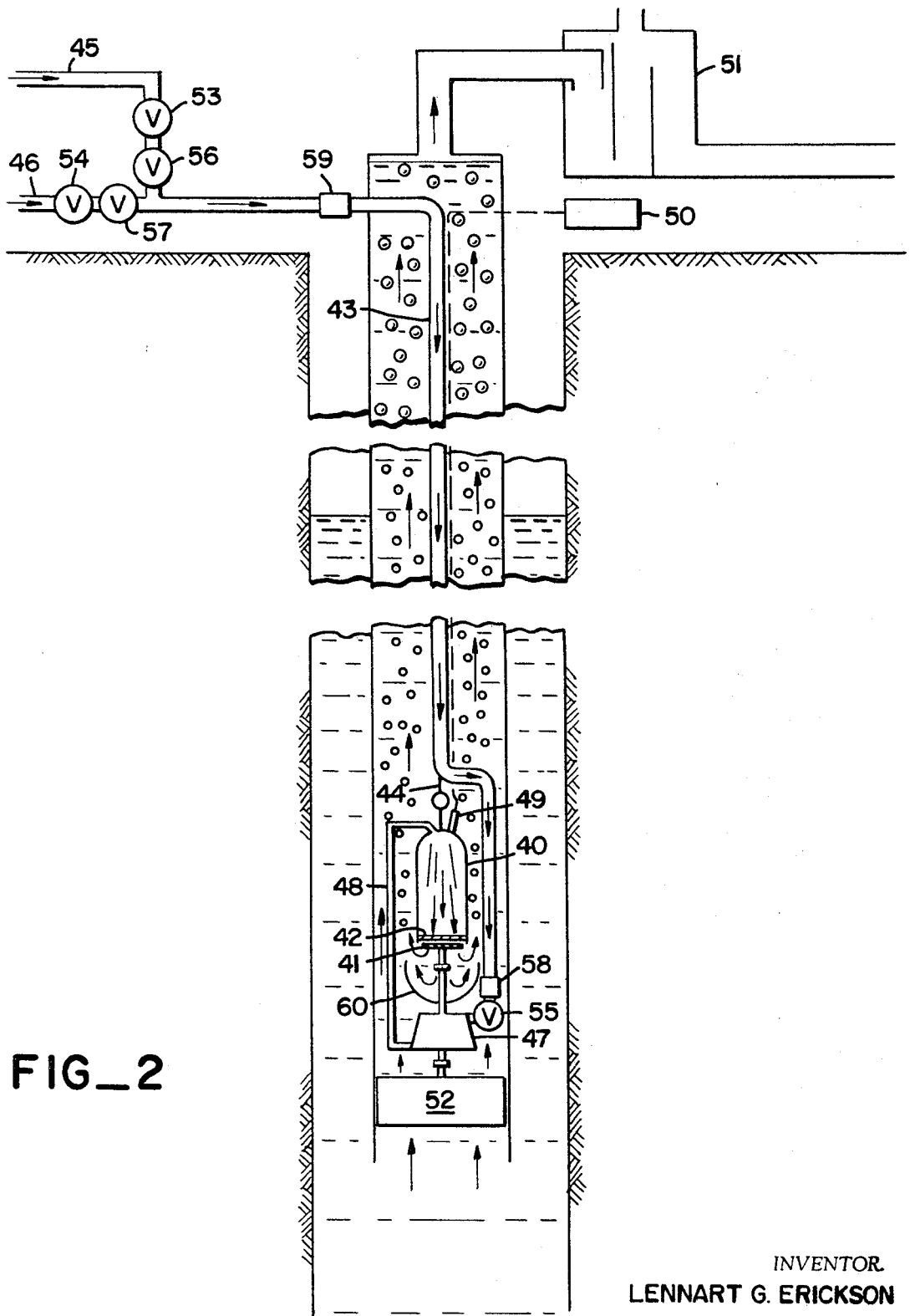
FIG_2

3,522,995
GAS-LIFT FOR LIQUID
Lennart G. Erickson, 2075 Pioneer Court,
San Mateo, Calif. 94402
Filed Sept. 5, 1968, Ser. No. 757,590
Int. Cl. F04f *1/16, 1/00;* F02g *3/00*
U.S. Cl. 417—55
14 Claims

ABSTRACT OF THE DISCLOSURE

Compressed air and fuel gas are supplied to a combustion chamber mounted below the surface of a liquid column to be lifted such as in a water or oil well. Combustion forms hot gases of expanded volume which provides the gas-lift motive force. Compressed air and fuel gas for the combustion chamber may be provided from the surface by one or more compressors driven by an auxiliary engine. Alternatively, a turbine rotor can be driven by the combustion products for powering at least one compressor that is mounted in direct combination with the combustion chamber below the liquid surface.

---

This invention relates to a method and apparatus for the gas-lift of liquids. More particularly, it relates to gas-lifting liquids with hot expanded gaseous combustion products where the combustion which generates the gaseous products occurs below the surface of the liquid to be lifted.

The use of gas to lift liquids is well known. For example, U.S. Pat. 1,042,227 describes a compressed air water elevator while U.S. Pat. 1,818,455 describes an air-lift suitable for use in an oil well. Both of these patents further describe the use of a combination of the gas-lift with an auxiliary pump to increase the efficiency of the air-lift.

In all prior air-lifts such as the above patents the air or gas utilized was compressed and supplied from the surface and piped to a point beneath the liquid surface for discharge. Where relatively large volumes of liquid are to be lifted, such as in the case of a large capacity well used for irrigating extensive agricultural land, tne cost of conventional motors and compressors needed for operating prior air-lift systems has been prohibitively high, thereby precluding the use of the air-lift principle.

The present invention provides a way for providing the necessary volume of high pressure air or gas for injection into a column of liquid to be lifted with a substantial reduction in the size of the requisite motor-compressor equipment. In the broad sense, a jet engine is employed with at least the combustion chamber located below the surface of the liquid at a suitable point for injecting the motive gas. A compressed air/fuel gas mixture is burned and the gaseous hot expanded products are discharged into the surrounding liquid. In one embodiment the jet engine components are separated and a surface compressor is run from an auxiliary power supply. The compressed air/fuel gas mixture is piped downwardly to the combustion chamber. In an alternative embodiment the jet engine is unitized and the combustion gases are used to power a turbine rotor which in turn operates a compressor beneath the liquid. In this case air and fuel gas are supplied at surface pressure and compressed in the vicinity of the combustion chamber.

The heated and expanded gaseous products of combustion produced are about 4–6 times greater in volume and at about the same pressure as the compressed air/fuel mixture supplied by the motor/compressor equipment. The substantial gain in volume of compressed gas available for air-lift purposes is a result of combustion beneath the liquid surface, thus achieving a proportional reduction in capacity of motor/compressor equipment than would otherwise be required.

In carrying out the above principle of subsurface combustion for providing the gas for lifting purposes, a number of related features and advantages are provided by this invention. The injected gas from the combustion chamber is relatively hot, on the order of 1500–2500° F. The gas bubbles in all air-lift systems tend to expand in size and increase in velocity due to declining pressure as they travel up the pipe column toward the surface atmospheric pressure state. Excess velocity results in excess friction losses, tending to reduce and limit the efficiency of the air-lift system. In the present improved system, the heat expanded gas injected at the bottom of a water well will be cooled by water contact as the bubbles move up the hole and proportionately contract in volume (relative to unheated air or gas) during the ascent. Thus the rate of expansion and acceleration of the heated gas is lessened—resulting in improved lifting efficiency. In addition, high temperature gas injected into the well will instantaneously convert some water into steam at a point immediately above the combustor, thus creating an increased flow of bubbles and contributing additional lifting effect in the rising column of water in the lower portion of the hole where the greatest lift is needed.

In oil well pumping applications, the injection of heat generated in the downhole combustor would serve to reduce the viscosity of the rising column of oil, thus contributing substantial additional lifting effect and lessening the problem of subsequent gas-oil separation. In the process of combustion, all available oxygen is consumed and eliminated from the gas injected into the rising fluid column and this may be advantageous in subsequent processing operations at the surface.

In the preferred embodiment the combustion chamber is formed as an inverted cup. This has the advantage of preventing water or liquid entry into the top of the chamber where the combustion ignition apparatus is suitably located. Compressed air/fuel in the top of the inverted cup chamber prevents fluid and liquid entry at all times. When the apparatus is shut down, means such as a check valve in the air/fuel supply pipes can be used to maintain an air/bubble in the combustion chamber.

The apparatus can be adapted for use in relatively shallow wells. As is well known, for efficient operation about 40% of the total length of the fluid production pipe column must be submerged below the fluid level in the well to secure a suitable water entry pressure at the point of injection of the compressed gas. This requires a deeper well than might otherwise be necessary. In one of the embodiments in which a turbine wheel is driven by the combustion gas output a source of rotational energy is provided down the well. In this case, it is convenient to drive a relatively small capacity pump and thereby increase the efficiency of the gas-lift and avoid the necessity of a deeper well simply to increase gas-lift efficiency.

A number of other specific features and advantages will be discussed in connection with the embodiments in the accompanying drawings. The overall desirable result achieved in this thermal-gas-lift, is the production of the necessary volume of high pressure lifting gas with much less costly and lower powered machinery than would otherwise be required. Overall fuel consumption should be less due to lessened mechanical equipment energy conversion losses. Maintenance costs will be substantially lower due to less mechanical complexity, particularly due to elimination of all rotating down-hole machinery.

In the accompanying drawings:

FIG. 1 is a schematic view of one embodiment of the gas-lift of this invention for use in a water well in which surface mounted compressors are driven by an auxiliary power source.

FIG. 2 is a schematic view of an alternative embodiment of the gas-lift of this invention in which a compressor and a water pump are driven in a down well location by the combustion gases.

With respect to FIG. 1 conduit 10 is connected to a source of a suitable combustible fuel gas and conduit 11 is connected to a source of oxygen, preferably air for combination with the fuel gas. The air is compressed in compressor 12 while the fuel gas reaches compressor 13 through conduit 14 to be compressed. Compressors 12 and 13 are driven by a suitable internal combustion engine 15 conveniently fueled by the same fuel gas provided from conduit 10. Compressors 12 and 13 are selected and operated to obtain output pressures required, proportionate to the depth of submergence of the combustor.

Operation of engine 15 produces heat. Instead of being wasted this heat is utilized in heat exchanger 16. Compressed air and fuel gas from compressor 12 and compressor 13 is conveyed to heat exchanger 16 through conduits 17 and 18 respectfully. Means such as check valves 19 and 20 prevent any back flow of gas into conduits 17 and 18. Metering valves 21 and 22 are provided to permit control of the amount of air and fuel gas respectively flowed into heat exchanger 16 and therefrom into conduit 23 for subsequent combustion. The valves 21 and 22 are adjusted so that the proportions of the air and fuel gas provide a mixture for efficient combustion.

As is well known in gas turbine technology, a "regenerator" heat exchanger can be employed to heat and expand the volume of air prior to combustion thus increasing the overall efficiency of the heated gas produced. A similar effect is obtained in this invention by using the heat from engine 15 in heat exchanger 16 to increase the temperature and volume of the air-fuel mixture flowing through heat exchanger 16 to conduit 23. The energy recovered and utilized correspondingly reduces the power required to drive compressor 12 and compressor 13.

The compressed air-gas mixture of proper proportions and pressure is then flowed to the inverted cup comprising combustion chamber 24. Combustion chamber or combustor 24 is positioned below the liquid level in the illustrated water well comprising well casing 25 and water pipe 26.

The compressed and heated air-fuel mixture flowing down into the well is potentially explosive but this may be protected against by adjusting the flow velocity through conduit or pipe 23 so that it is greater than the flame propagation rate for the particular gas mixture employed. In addition, conventional flame arrestors such as arrestors 27 and 27' may be employed for their usual function. Another alternative would be to use separate pipes for the air and fuel gas and permit the gases to be mixed only at the point of injection into combustion chamber 24. It is also contemplated that the compressed air-fuel pipe 23 may be insulated to reduce heat and volume losses prior to combustion.

The inverted cup arrangement for combustion chamber 24 has the advantage that the compressed air and fuel in the top of the chamber prevents liquid entry. When the well is shut down, a suitable mechanism such as a check valve 28 in pipe 23 traps an air-gas bubble in combustion chamber 24 to prevent liquid entry during the non-operating period.

It is desirable to maintain an optimum high temperature of the combustion chamber 24 internal surfaces for combustion efficiency while not approaching the actual flame temperature to prevent deterioration of the hot combustion surfaces. Control of temperature can be achieved very easily by selection of appropriate thermal heat conduction characterictics of an insulating jacket for combustor 24 which can be used as desired. Alternatively metal radiating fins could be used to dissipate the necessary excess proportion of heat by conduction to the surrounding water or other liquid in the well.

Ignition of the air fuel mixture in combustor 24 is suitable accomplished by an electric spark across an electrode gap of igniter 29 in the top of combustor 24. An insulated cable 30 connects igniter 29 to a suitable high voltage source 31 preferably located at the surface and which may comprise a high tension magneto or battery coil.

When the air-fuel gas mixture is ignited in combustor 24, hot (about 1500–2500° F.) gaseous combustion products are discharged through the bottom open end of combustor 24. During combustion the volume of the air-gas mixture from pipe 23 undergoes a 4–6 times volume increase while maintaining approximately the original pressure. The initial downward direction of the combustion product is changed in direction by an arcuate deflector 31 spaced downwardly from the bottom open end of combustor 24. The hot expanded gas product then moves upwardly as shown by the arrows. The function of deflector 31 is similar to the thrust reversers employed on jet airplane engines for braking purposes.

Gas volumes and flow rates are controlled so that about 1.6–2.0 cubic feet of gas per gallon of water to be lifted is discharged from combustor 24. The gas bubbles such as bubbles 32, 32', 32" tend to expand in size and increase in velocity due to declining pressure as they travel up pipe 26 toward the surface atmospheric pressure state. However, as explained earlier, the high temperature of the gas bubbles at the time of discharge from combustor 24 is cooled by water contact during this travel resulting in a proportional contraction in volume. These expansion and contraction factors cancel each other and thereby improve the lifting efficiency of the system.

The gas lifted liquid enters a conventional gas liquid separation chamber 33 which may be located at the top of pipe 26 as shown in FIG. 1 or it may be spaced therefrom and connected by a conduit as shown by FIG. 2. Separated gas is vented at 34 and the liquid obtained is flowed through conduit 34. Selector valve 35 can be positioned to allow a discharge through conduit 36 for flood irrigation in the case of a water well for example. Alternatively, selector valve 35 can be positioned to channel the water through conduit 37 to pump 38 which is preferably driven by engine 15. In this alternative the water can be increased in pressure above atmospheric pressure, for example on the order of 50–90 p.s.i. so that the water discharged into conduit 39 is useful for sprinkler irrigation.

With respect to FIG. 2 the major differences are found in the down-hole region of the well. Here combustor 40 includes a turbine rotor 41 and stator vanes 42 at the lower open end of the inverted cup configuration of combustor 40. As before, fuel gas and air are supplied downwardly through pipe 43 with combustor 40 being supported therefrom by a suitable support link 44. The fuel gas supplied from a source to conduit 45 and air supplied to conduit 46 proceeds past combustor 40 to compressor 47. Compressor 47 is driven by the rotation of turbine rotor 41.

A single compressor is used in the embodiment of FIG. 2 with the proportions of fuel and air suitably adjusted at the input at 45 and 46 for efficient combustion. Two compressors could be used as in FIG. 1 if desired or vice versa.

The compressed air and fuel is then fed to the top of combustor 40 through conduit 48 and ignited therein by igniter 49 and high voltage source 50. The discharge of gaseous products creates lift for the water as in FIG. 1. The lifted water is separated from gas in separator 51. The water can then be used for any desirable purpose such as flood irrigation or be increased in pressure by an auxiliary pump as desired.

Availability of a source of rotational energy at the bottom of the well makes it possible to also drive water pump 52. Pump 52 eliminates the principal limitation of all fluid pumping systems using only gas to produce the lifting effect as discussed previously. As a result the system can be used effectively for pumping from relatively shallow wells.

Finally the embodiment of FIG. 2 includes check valves 53, 54, and 55, metering valves 56 and 57, flame arresters 58 and 59 and deflector 60 for the same purposes as the counterpart structures as shown in FIG. 1.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A gas-lift fluid pumping system comprising: a combustion chamber for installation below the surface of a column of liquid to be raised, said combustion chamber having an outlet for the discharge of combustion products to subsurface areas of said column of liquid; at least one compressor disposed above the surface of said column of liquid for supplying air and fuel gas to said combustion chamber; an internal combustion engine coupled to said compressor; a heat exchanger connected for receiving heat generated by said internal combustion engine; a conduit from the output of said compressor to said heat exchanger whereby the compressed gas is preheated prior to being supplied to said combustion chamber; and means for initiating the combustion of said preheated air and fuel gas in said combustion chamber, the gaseous combustion products produced thereby being discharged through said outlet and being available to provide a gas-lift for said column of liquid.

2. A gas-lift fluid pumping system in accordance with claim 1 and including a gas-liquid separator connected for receiving fluid lifted by said fluid pumping system.

3. A gas-lift fluid pumping system in accordance with claim 2 and including a booster pump connected for actuation by the said internal combustion engine, the liquid output from said gas-liquid separator being connected to said booster pump to increase the pressure thereof.

4. A gas-lift fluid pumping system in accordance with claim 1 wherein two compressors are connected for actuation by said internal combustion engine, one compressor being connected to a source of air and the other compressor being connected to a source of fuel gas.

5. A gas-lift fluid pumping system in accordance with claim 1 wherein said combustion chamber comprises an inverted cup, and including valve means associated with said means for supplying said air and fuel gas to said inverted cup adapted to maintain gas in said inverted cup when installed below liquid to be lifted to prevent the entry of liquid into the cup.

6. A gas-lift fluid pumping system in accordance with claim 5 wherein said means for initiating the combustion of air and fuel gas in said combustion chamber comprises electrically actuated spark producing means mounted in said inverted cup and connected to an electrical source above the surface of said column of liquid.

7. A gas-lift fluid pumping system in accordance with claim 5 and including a deflector spaced from the open end of said inverted cup to change the direction of gaseous combustion products discharged therefrom.

8. A gas-lift fluid pumping system in accordance with claim 1 wherein said means for supplying air and fuel gas to said combustion chamber includes at least one flame arrester between said combustion chamber and the source of said fuel gas.

9. A gas-lift fluid pumping system comprising a combustion chamber for installation below the surface of a column of liquid to be raised, said combustion chamber having an outlet for the discharge of combustion products to subsurface areas of said column of liquid; at least one compressor connected to said combustor for supplying compressed air and compressed fuel gas to said combustor; a turbine rotor mounted in cooperation with said combustor, said compressor mounted below the surface of said liquid in association with said turbine rotor for actuation thereby; and means for initiating the combustion of said air and fuel gas in said combustion chamber, the gaseous combustion products produced thereby being discharged through said outlet and being available to provide a gas-lift for said column of liquid.

10. A gas-lift pumping system in accordance with claim 9 and including a pump adjacent to said jet engine driven thereby to increase ambient water pressure adjacent to said jet engine and promote more efficient gas-lifting by said jet engine.

11. The improvement in accordance with claim 9 and including a liquid pump below the surface of said liquid in association with said turbine rotor for actuation thereby.

12. A method for gas-lifting well water comprising: combusting compressed fuel gas and air to provide hot expanded gas products, and injecting said expanded gas products at a subsurface point in said well to lift the water therein, controlling the temperature of said injected gas products to hold it within the range of 1500°–2500° F. and controlling the bubble size increase of said gas products as the bubbles rise to the well surface.

13. A method for gas-lifting well water in accordance with claim 12 wherein the volume of the gas products injected is about 1.6–2.0 cubic feet per gallon of water to be lifted.

14. A method for gas-lifting well water in accordance with claim 12 wherein the compressed fuel gas and air through process of combustion is increased 4–6 times in volume while substantially maintaining the same pressure.

References Cited

UNITED STATES PATENTS

| | | | |
|---|---|---|---|
| 1,285,678 | 11/1918 | Giailever | 103—250 |
| 1,818,455 | 8/1931 | Bigelow. | |
| 2,272,477 | 2/1942 | Pfleger | 103—249 |
| 2,275,947 | 3/1942 | Courtney | 103—232 |
| 2,532,635 | 12/1950 | Miller | 103—249 |
| 2,636,445 | 4/1953 | Tutton | 103—249 |
| 2,699,125 | 1/1955 | Scott | 103—249 X |
| 2,898,978 | 8/1959 | Kitchen et al. | 60—39.11 |

DONLEY J. STOCKING, Primary Examiner

W. J. KRAUSS, Assistant Examiner

U.S. Cl. X.R.

60—39.11; 417—73, 115